United States Patent
Wang et al.

(10) Patent No.: US 10,125,249 B2
(45) Date of Patent: *Nov. 13, 2018

(54) POLARITY MANIPULATION IN POLYSTYRENE FOR ENHANCED BIO-POLYMER MISCIBILITY

(71) Applicant: FINA TECHNOLOGY, INC., Houston, TX (US)

(72) Inventors: Wei Wang, League City, TX (US); David W. Knoeppel, League City, TX (US); Jose M. Sosa, Deer Park, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,857

(22) Filed: Dec. 10, 2014

(65) Prior Publication Data

US 2015/0094404 A1 Apr. 2, 2015

Related U.S. Application Data

(63) Continuation of application No. 13/171,828, filed on Jun. 29, 2011, now Pat. No. 8,957,152.

(51) Int. Cl.

| | |
|---|---|
| *C08K 5/00* | (2006.01) |
| *C08L 29/04* | (2006.01) |
| *C08L 25/14* | (2006.01) |
| *C08L 35/06* | (2006.01) |
| *C08L 67/04* | (2006.01) |
| *C08L 1/00* | (2006.01) |
| *C08L 3/00* | (2006.01) |
| *C08L 5/00* | (2006.01) |
| *C08L 25/08* | (2006.01) |

(52) U.S. Cl.
CPC ............ *C08L 25/14* (2013.01); *C08L 1/00* (2013.01); *C08L 3/00* (2013.01); *C08L 5/00* (2013.01); *C08L 25/08* (2013.01); *C08L 29/04* (2013.01); *C08L 35/06* (2013.01); *C08L 67/04* (2013.01); *C08K 5/0016* (2013.01); *C08L 2201/06* (2013.01)

(58) Field of Classification Search
CPC ....... C08K 5/0016; C08L 29/04; C08L 25/14; C08L 35/06; C08L 67/04; C08L 1/00; C08L 3/00; C08L 5/00; C08L 25/08; C08L 2201/06
USPC ........................................................ 524/513
See application file for complete search history.

(56) References Cited

U.S. PATENT DOCUMENTS

| | | | |
|---|---|---|---|
| 3,658,946 A | 4/1972 | Bronstert et al. | |
| 3,660,535 A | 5/1972 | Finch et al. | |
| 4,777,210 A | 10/1988 | Sosa et al. | |
| 5,540,813 A | 7/1996 | Sosa et al. | |
| 6,706,827 B1 | 3/2004 | Lyu et al. | |
| 8,957,152 B2 * | 2/2015 | Wang .................... | C08L 29/04 524/513 |
| 2009/0234035 A1 * | 9/2009 | Cheung .................. | C08J 9/0061 521/81 |
| 2010/0160505 A1 * | 6/2010 | Kumazawa ............. | C08L 67/04 524/112 |

* cited by examiner

*Primary Examiner* — Angela C Scott
(74) *Attorney, Agent, or Firm* — Albert Shung

(57) ABSTRACT

A styrenic composition including a polar modified styrenic co-polymer resulting from the polymerization of a combined mixture of at least one styrenic monomer and at least one comonomer and a biodegradable component is disclosed. The at least one comonomer includes a polar functional group and the polar modified styrenic co-polymer and the biodegradable component are combined to obtain a styrenic composition having a biodegradable component. Also disclosed is a method of enhancing bio-polymer miscibility in a styrenic based polymer. The polarity of a blend is manipulated by combining a styrenic monomer and a polar co-monomer to form a combined mixture and subjecting the combined mixture to polymerization to obtain a styrenic polymer blend to which a bio-polymer is added.

18 Claims, 8 Drawing Sheets

POLARITY MANIPULATION IN POLYSTYRENE FOR ENHANCED BIO-POLYMER MISCIBILITY

CROSS-REFERENCE TO RELATED APPLICATIONS

This application is a continuation of U.S. patent application Ser. No. 13/171,828, filed on Jun. 29, 2011.

FIELD

The present invention is generally related to polymeric compositions. More specifically, the present invention is related to polystyrene blends containing biodegradable polymer compositions.

BACKGROUND

Styrene, also known, as vinyl benzene, is an aromatic compound that is produced in industrial quantities from ethyl benzene. The most common method of styrene production comprises the dehydrogenation of ethyl benzene, which produces a crude product of styrene and unreacted ethyl benzene and hydrogen. Polystyrene is an aromatic polymer produced from styrene monomer. Polystyrene is a widely used polymer commonly found in many commercial applications.

Many industries seek to replace the metals used for structural materials with plastics. Plastics like polystyrene are typically lighter and less expensive than metals. Plastics may also be used as thermal or electrical insulators because they do not typically interfere with magnetic or electrical signals. Polystyrene is a durable and inexpensive polymer that is frequently encountered in daily life. However, polystyrene is typically weaker than metals. Thus, polystyrene is commonly combined with other polymers or composite materials such as fibers to provide improved strength and other properties. Some of the varied applications of polystyrene include insulation, foam cups, disposable cutlery, food packaging, office supplies, CD/DVD cases, housewares, appliance linings, cosmetics packaging, toys, computer housings, bottles, tubing, and dunnage.

Polystyrene containing products are often discarded and only a small fraction of discarded polystyrene products are recovered and recycled. In addition, byproducts and excess amounts of polystyrene and polystyrene containing compositions are produced during the process of molding, shaping and producing the products containing polystyrene. These byproducts, along with post consumer polystyrene products, often become waste. This waste typically ends up in landfills, or incinerators, or sometimes results in litter. Most of these products are non-biodegradable and thus remain long after disposal.

Poly(lactic acid) or PLA is a bio-derived and biodegradable and compostable polymer. Use of PLA as a biodegradable modifier to polystyrene brings additional marketable "environmentally friendly" value to commodity polystyrene and can add a biodegradable aspect to the otherwise non-biodegradable commodity polystyrene. However, combining these two materials has proven to be difficult. PLA and polystyrene form an immiscible polymer blend when combined, therefore, the combination of the two materials into one homogenous phase has been difficult. These heterogeneous mixtures of polystyrene and PLA have not resulted in products that can replace stronger, non-biodegradable, polystyrene blends currently on the market.

It would thus be desirable to obtain a homogenous polystyrene blend containing PLA. It would also be desirable to obtain a biodegradable polystyrene blend that is strong enough to be used in a wide variety of applications.

SUMMARY

An embodiment of the present invention, either by itself or in combination with other embodiments of the invention, includes a styrenic based polymer containing a biodegradable component and to an article made from the styrenic based polymer containing a biodegradable component.

An embodiment of the invention is a styrenic composition that includes a polar modified styrenic co-polymer resulting from the polymerization of a combined mixture of at least one styrenic monomer and at least one comonomer that includes includes a polar functional group. The polar modified styrenic co-polymer and a biodegradable component are combined to obtain a styrenic composition comprising a biodegradable component and a biodegradable component.

The styrenic monomer can be selected from the group consisting of styrene, alpha-methyl styrene, vinyl toluene, p-methyl styrene, t-butyl styrene, o-chlorostyrene, and vinyl pyridine and any combinations thereof. The styrenic co-polymer can be present in the polar modified blend in amounts ranging from 75 to 99 wt % based on the total weight of the polar modified blend.

The comonomer having a polar functional group can be selected from the group of alkyl-(meth)acrylate, hydroxylalkyl(meth)acrylate, caprolactone(meth)acrylate, polyethylene glycol(meth)acrylate, silyl-(meth)acrylate, and fluoroalkyl(meth)acrylate.

The biodegradable component can be selected from the group consisting of polylactic acid (PLA), biodegradable polyesters, polyhydroxybutyrates (PHB), polyhydroxyalkanoates (PHA), polycaprolactone (PCL), polyvinyl alcohol (PVA), and combinations thereof. The biodegradable component in the styrenic based polymer can have a particle size distribution with a peak particle size of less than 2.0 μm.

A polar additive can be present in the polar modified blend in amounts ranging from 0.5 to 10 wt % based on the total weight of the blend, and can be a polar plasticizer. The polar plasticizer can be selected from the group of styrene-maleic anhydride, glyceride oil, oligomeric polyether and polyester, and combinations thereof.

An embodiment of the present invention, either by itself or in combination with other embodiments of the invention, is a method of making a styrenic polymer containing a biodegradable component by combining a styrenic monomer and a monomer comprising a polar functional group to form a combined mixture. The combined mixture is polymerized to form a polar modified styrenic co-polymer that is combined with a biodegradable component to obtain a styrenic based polymer containing a biodegradable component.

In an embodiment of the present invention, either by itself or in combination with other embodiments of the invention, the method can include combining the styrenic co-polymer with a polar additive prior to combining the polar modified styrenic co-polymer with the biodegradable component.

The embodiments disclosed herein are usable and combinable with every other embodiment disclosed herein, and consequently, this disclosure is enabling for any and all combinations of the embodiments disclosed herein.

DETAILED DESCRIPTION

Figure 1:
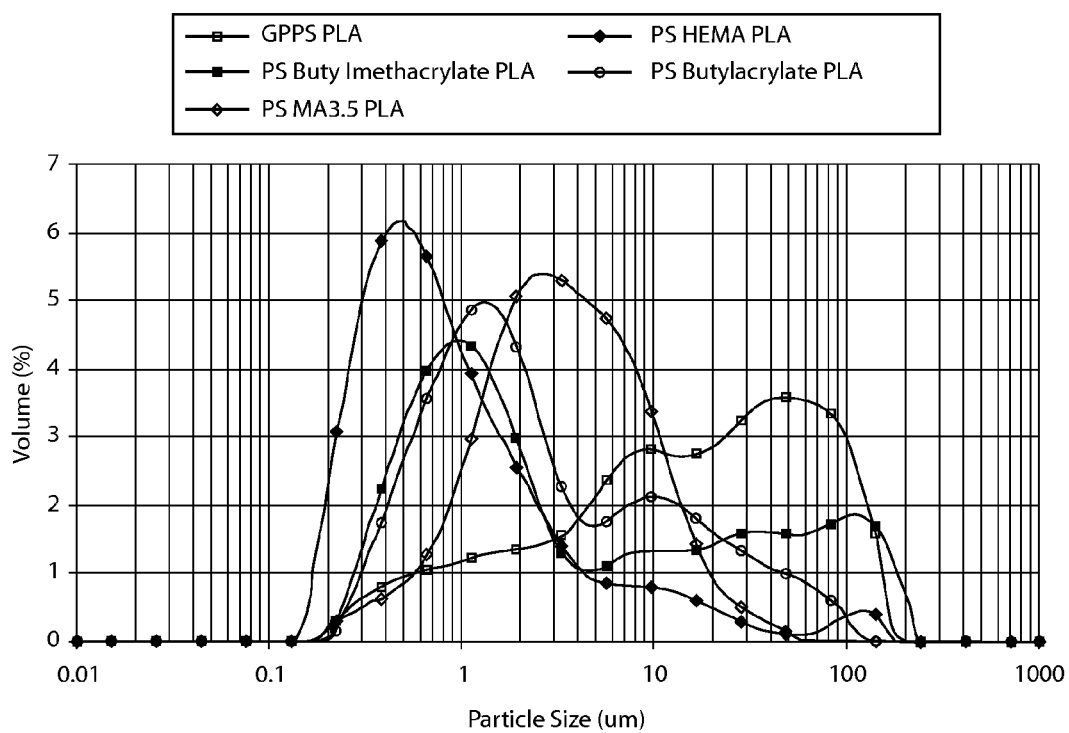
FIG. 1 is a graph illustrating PLA particle size distribution from blends of PLA with various polystyrene copolymers.

The present invention includes blends of styrenic polymers with optional polar additives and a biodegradable component. In an embodiment, the present invention includes blends of polystyrenic homopolymers and/or copolymers and polar additives to enhance the miscibility of biodegradable components. In another embodiment, the present invention includes a blend of homopolymers and/or copolymers of polystyrene with polar additives and with biodegradable components. The present invention also includes blends of styrenic polymers and biodegradable polymers. In a more specific embodiment, the present invention includes a blend of homopolymers and/or copolymers of polystyrene and poly(lactic acid), or PLA, based homopolymers and/or copolymers.

In an embodiment, the blend of the presently disclosed composition includes a styrenic polymer. In another embodiment, the styrenic polymer includes polymers of monovinylaromatic compounds, such as styrene, α-methyl styrene and ring-substituted styrenes. In an alternative embodiment, the styrenic polymer includes a homopolymer and/or copolymer of polystyrene. In a further embodiment, the styrenic polymer is polystyrene. In an even further embodiment, styrenic monomers for use in the styrenic polymer composition can be selected from the group of styrene, alpha-methyl styrene, vinyl toluene, p-methyl styrene, t-butyl styrene, o-chlorostyrene, vinyl pyridine, and any combinations thereof. The styrenic polymeric component in the blend of the present invention can be produced by any known process. In an embodiment, the styrenic polymer is polystyrene.

The blend of the present invention may contain any desired amounts of a styrenic polymer. In an embodiment, the blend contains at least 50 wt % of a styrenic polymer. In another embodiment, the blend contains a styrenic polymer in amounts ranging from 1 to 99 wt %, 50 to 95 wt %, 60 to 92 wt %, and optionally 75 to 90 wt %. In a further embodiment, the blend contains a styrene polymer in amounts ranging from 80 to 99 wt %. In an even further embodiment, the blend contains a styrenic polymer in amounts ranging from 90 to 95 wt %.

In embodiments of the present invention the styrenic polymer of the present invention may include general-purpose polystyrene (GPPS), high-impact polystyrene (HIPS), or any combinations of the two. In an embodiment, the styrenic polymer of the present invention may be HIPS that further contains an elastomeric material. In an embodiment, the HIPS may contain an elastomeric phase embedded in the polystyrene matrix, which results in the styrenic polymer having an increased impact resistance.

The HIPS may contain any desired elastomeric material. In an embodiment, the elastomeric material is a conjugated diene monomer. In an embodiment, the conjugated diene monomers may include without limitation 1,3-butadiene, 2-methyl-1,3-butadiene, 2-chloro-1,3 butadiene, 2-methyl-1,3-butadiene, and 2-chloro-1,3-butadiene. In another embodiment, the elastomer is an aliphatic conjugated diene monomer. In an embodiment, the aliphatic conjugated diene monomers include $C_4$ to $C_9$ dienes such as butadiene monomers. Blends or copolymers of the diene monomers may also be used as well as mixtures or blends of one or more elastomers. In an embodiment, the elastomer includes a homopolymer of a diene monomer. In another embodiment, the elastomer includes polybutadiene. The elastomer may be present in the HIPS in any desired amounts. In an embodiment, the elastomer may be present in the HIPS in amounts ranging from 1 to 20 wt. %, alternatively from 2 to 15 wt. %, and alternatively 5 to 11 wt. % based on the total weight of the HIPS.

The styrenic polymer of the present invention may be a styrenic copolymer. The styrenic polymer of the present invention may be formed by co-polymerizing a first monomer with a second monomer. The first monomer and the second monomer may be co-polymerized by having the first monomer and the second monomer present in a reaction mixture that is subjected to polymerization conditions. The first monomer may include monovinylaromatic compounds, such as styrene, alpha-methyl styrene and ring-substituted styrenes. In an embodiment, the first monomer is selected from the group of styrene, alpha-methyl styrene, vinyl toluene, p-methyl styrene, t-butyl styrene, o-chlorostyrene, vinyl pyridine, and any combinations thereof. In another embodiment, styrene is used exclusively as the first monomer.

The first monomer may be present in the reaction mixture in any desired amounts. In an embodiment, the first monomer is present in the reaction mixture in amounts of at least 50 wt % of the reaction mixture. In another embodiment, the first monomer is present in the reaction mixture in amounts ranging from 90 to 99.9 wt % of the reaction mixture. In a further embodiment, the first monomer is present in the reaction mixture in amounts ranging from 95 to 99 wt %.

The second monomer may contain a polar functional group. In an embodiment, the second monomer containing a polar functional group is a polar vinyl functional monomer. In another embodiment, the polar vinyl functional monomer is selected from the group of alkyl-(meth)acrylate, hydroxylalkyl(meth)acrylate, caprolactone(meth)acrylate, polyethylene glycol(meth)acrylate, silyl-(meth)acrylate, and fluoroalkyl(meth)acrylate.

The styrenic polymer may be prepared from any desired amounts of a second monomer. In an embodiment, the second monomer is present in the reaction mixture in amounts of at least 0.1 wt %. In another embodiment, the second monomer is present in the reaction mixture in amounts ranging from 1 to 20 wt %. In a further embodiment, the second monomer is present in the reaction mixture in amounts ranging from 1 to 10 wt %. In an even further embodiment, the second monomer is present in the reaction mixture in amounts ranging from 1 to 5 wt %.

In addition to a styrenic polymer component and a biodegradable component, the blend of the present invention may also contain polar additives.

The polar additives of the present invention may contain polar plasticizers. In an embodiment, the polar plasticizers are selected from the group of styrene-maleic anhydride, glyceride oil, oligomeric polyether and polyester, and combinations thereof. In an embodiment, the styrene-maleic anhydride (SMA) polymers include SMA® EF40 (EF40) and SMA® EF80 (EF80), which are commercially available from Sartomer Company, Inc. EF40 includes styrene-to-maleic anhydride ratios of 4:1, while EF 80 includes styrene-to-maleic anhydride ratios of 8:1. In an embodiment the styrene-to-maleic anhydride ratios of can range from 1:1 to 12:1, optionally from 2:1 to 11:1, optionally from 4:1 to 10:1. In an embodiment, the polar plasticizer(s) may be present in the blend in amounts of at least 0.1 wt % based on the total weight of the blend. In another embodiment, the polar plasticizer(s) may be present in the blend in amounts ranging from 0.5 to 10 wt %. In a further embodiment, the polar plasticizer(s) may be present in the blend in amounts ranging from 1 to 5 wt %. In an even further embodiment, the polar plasticizer(s) may be present in the blend in amounts ranging from 1.5 to 2.5 wt %.

The blends of the present invention may contain any bio-polymer containing component. In an embodiment, the bio-polymer is a biodegradable polymer. In another embodiment, the blends of the present invention may contain any biodegradable polymer or polymers. In another embodiment, the blends of the present invention may contain any polar bio-polymer. In another embodiment, the bio-polymer and the biodegradable polymer are each selected from the group of polylactic acid (PLA), polyhydroxybutyrates (PHB), polyhydroxyalkanoates (PHA), polycaprolactone (PCL), polyvinyl alcohol (PVA), and combinations thereof. In a further embodiment, the biodegradable polymer and the bio-polymer are each selected from the group of polylactic acid (PLA), polyhydroxybutyrates (PHB), polyhydroxyalkanoates (PHA), polycaprolactone (PCL), polyvinyl alcohol (PVA), polybutylenesuccinate homopolymer, polybutyleneadipate homopolymer, polybutylenesuccinate-adipate copolymer, polyethylenesuccinate homopolymer, polyethyleneadipate homopolymer, polyethylenesuccinate-adipate copolymer, and a copolyester of an aliphatic polyester, and combinations thereof. In a further embodiment, the biodegradable polymer and the bio-polymer are each selected from a polysaccharide such as starch, cellulose, and glycogen and other sugar-based polymers.

In an embodiment, the biodegradable polymer is polylactic acid. Poly(lactic acid), polylactic acid, or PLA, can be made from lactic acid (lactate). Lactic acid is a naturally occurring molecule that is widely used in foods as a preservative and flavoring agent. Lactic acid may be chemically synthesized or produced by microbial fermentation of sugars such as glucose or hexose. In an embodiment, lactic acid is produced by fermentation of sugar feed stocks. The sugar feed stocks may be obtained from farm products, farming by-products and wastes. The sugar feed stocks may be obtained from farm products, farming by-products and wastes. In another embodiment, the sugar feed stocks are selected from the group of potato wastes, corn products, beet products, sugar cane wastes, and dairy wastes and combinations thereof. In an embodiment, the lactic acid produced by fermentation of sugar feed stocks is subsequently converted to obtain lactic acid monomers, which are then polymerized to obtain PLA.

Lactic acid monomers essentially exists in two stereoisomeric forms which yield morphologically distinct polymers selected from the group of poly(L-lactic acid), poly(D-lactic acid), poly(D,L-lactic acid), and meso-polylactic acids and any combinations thereof. PLA can include homopolymers and/or copolymers of lactic acid. The homopolymers of lactic acid can be selected from the group of poly(L-lactic acid), poly(D-lactic acid), and poly(D,L-lactic acid) and any combinations thereof. The copolymers of lactic acid may have a lactic acid comonomer content of at least 50 wt % based on the total weight of the copolymer. The copolymers of lactic acid may have a lactic acid comonomer content that ranges from 50 to 100 wt %, optionally from 60 to 95 wt %, optionally from 70 to 90 wt % based on the total weight of the copolymer.

Lactic acid cannot be directly polymerized to a useful product, instead, lactic acid is optionally oligomerized and catalytically dimerized to make a cyclic lactide monomer (lactic acid monomer). Although dimerization also generates water, it can be separated prior to polymerization. The polymerization may be performed by polycondensation methods or ring-opening polymerization methods. In an embodiment, PLA may be produced by polycondensation. In an embodiment in which the polymerization is performed by polycondensation, the lactic acid monomer may be directly subjected to dehydropolycondensation to obtain a desired polylactic acid composition. In the direct dehydration polycondensation method, the lactic acid may be subjected to azeotropic dehydration condensation in the presence of an organic solvent.

In an embodiment, the PLA may be produced by ring-opening polymerization. In ring-opening polymerization, lactide (i.e., cyclic dimer of lactic acid) may be subjected to polymerization by the aid of a polymerization-adjusting agent and a catalyst to obtain polylactic acid.

The polylactic acid may have a weight average molecular weight ranging from 5,000 to 1,000,000, 10,000 to 400,000, 30,000 to 300,000, and optionally 100,000 to 250,000. In an embodiment, the polylactic acid can include commercially available polylactic acids such as those sold by NatureWorks LLC (owned by Cargill Corporation), including Ingeo PLA 3251D, NatureWorks PLA 4032, 4042, and 4060 trade names. The PLA 4032 grade may have a D isomer monomer content from 1.2 to 1.6 wt %, the PLA 4042 grade may have a D isomer monomer content from 3.7 to 4.8 wt %, and the PLA 4060 grade may have a D isomer monomer content from 11.0 to 13.0 wt %. In a non-limiting embodiment the polylactic acid can have a D isomer monomer content from 0.5 to 30.0 wt %, optionally from 1.0 to 25.0 wt %, optionally from 1.0 to 20.0 wt %, optionally from 1.0 to 15.0 wt %.

The blend of the presently disclosed composition may contain any amount of PLA in order to achieve desired properties. In an embodiment, the blend contains at least 0.1 wt % PLA. In another embodiment, the blend contains amounts ranging from 0.1 to 90 wt %, 0.5 to 50 wt %, 1 to 30 wt %, 2 to 20 wt %, 3 to 10 wt %, and optionally 5 wt % PLA. In a further embodiment, the blend contains PLA in amounts ranging from 1 to 10 wt % PLA. In an even further embodiment, the blend contains PLA in amounts ranging from 3 to 8 wt % PLA.

The blend of the presently disclosed composition may be prepared by co-polymerizing a styrenic monomer with a second monomer containing a polar functional group. In an embodiment, styrene monomer and the second monomer containing the polar functional group are combined and polymerized in a polymerization reactor wherein the styrene monomer and second monomer containing the polar functional group are copolymerized to produce a polystyrene copolymer. The polystyrene copolymer may then be mixed with a biodegradable polymer to obtain a biodegradable polymeric blend. The biodegradable polymeric blend may then be sent to an extruder or other step to obtain an end use article.

The polymerization of the styrenic monomer and the second monomer, or co-monomer, may be carried out using any method known to one having ordinary skill in the art of performing such polymerizations. In an embodiment, the polymerization may be carried out by using a polymerization initiator.

In an embodiment, the polymerization initiators include radical polymerization initiators. These radical polymerization initiators include but are not limited to perketals, hydroperoxides, peroxycarbonates and the like. In another embodiment, the polymerization initiators may be selected from the group of benzoyl peroxide, lauroyl peroxide, t-butyl peroxybenzoate, and 1,1-di-t-butylperoxy-2,4-di-t-butylcycleohexane, and combinations thereof. In an embodiment, the amount of the polymerization initiator is from 0 to 1 percent by weight of the monomers and co-monomers. In another embodiment, the amount of the polymerization initiator is from 0.01 to 0.5 percent by weight of the monomers and co-monomers. In a further embodiment, the amount of the polymerization initiator is from 0.025 to 0.05 percent by weight of the monomers and co-monomers.

Any process capable of processing or polymerizing styrenic monomers may be used to prepare the styrenic co-polymer of the presently disclosed composition. In an embodiment, any polymerization reaction for preparing general purpose polystyrene or high-impact polystyrene may be used to prepare the styrenic co-polymer of the presently disclosed composition. In an embodiment, the polymerization reaction to prepare the styrenic co-polymer may be carried out in a solution or mass polymerization process. Mass polymerization, or bulk polymerization, refers to the polymerization of a monomer in the absence of any medium other than the monomer and a catalyst or polymerization initiator. Solution polymerization refers to a polymerization process wherein the monomers and polymerization initiators are dissolved in a non-monomeric liquid solvent at the beginning of the polymerization reaction.

The polymerization may be either a batch process or a continuous process. In an embodiment, the polymerization reaction may be carried out using a continuous production process in a polymerization apparatus including a single reactor or multiple reactors. The styrenic polymer composition can be prepared using an upflow reactor, a downflow reactor, or any combinations thereof. The reactors and conditions for the production of a polymer composition, specifically polystyrene, are disclosed in U.S. Pat. No. 4,777,210, which is incorporated by reference herein in its entirety.

The temperature ranges useful in the polymerization process of the present disclosure can be selected to be consistent with the operational characteristics of the equipment used to perform the polymerization. In an embodiment, the polymerization temperature ranges from 90 to 240° C. In another embodiment, the polymerization temperature ranges from 100 to 180° C. In yet another embodiment, the polymerization reaction may be carried out in multiple reactors in which each reactor is operated under an optimum temperature range. For example, the polymerization reaction may be carried out in a reactor system employing a first polymerization reactor and a second polymerization reactor that may be either continuously stirred tank reactors (CSTR) or plug-flow reactors. In an embodiment, a polymerization process for the production of a styrenic co-polymer of the type disclosed herein containing multiple reactors may have the first reactor (e.g., a CSTR), also referred to as a prepolymerization reactor, operated under temperatures ranging from 90 to 135° C. while the second reactor (e.g. CSTR or plug flow) may be operated under temperatures ranging from 100 to 165° C.

In an alternative embodiment, the co-polymer may be obtained by polymerization in which heat is used as the initiator. In a further embodiment, the co-polymer may be prepared using a non-conventional initiator such as a metallocene catalyst as is disclosed in U.S. Pat. No. 6,706,827 to Lyu, et al., which is incorporated herein in its entirety by reference. In one embodiment, the monomers may be admixed with a solvent and then polymerized. In another embodiment, one of the monomers is dissolved in the other and then polymerized. In still another embodiment, the monomers may be fed concurrently or separately to a reactor, either neat or dissolved in a solvent, such as mineral oil. In yet another embodiment, the second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation known to be useful to those of ordinary skill in the art in preparing such polymers may be used. For example, the process disclosed in U.S. Pat. No. 5,540,813 to Sosa, et al., may be used and is incorporated herein in its entirety by reference. The processes disclosed in U.S. Pat. No. 3,660,535 to Finch, et al., and U.S. Pat. No. 3,658,946 to Bronstert, et al., may be used and are both incorporated by reference herein in their entirety. Any process for preparing general purpose polystyrene may be used to prepare the styrenic co-polymer of the presently disclosed composition.

In certain embodiments, the styrenic copolymer may be admixed with additives prior to being used in end use applications. For example, the styrenic copolymer may be admixed with additives that include without limitation stabilizers, chain transfer agents, antioxidants, UV stabilizers, lubricants, plasticizers, ultra-violet screening agents, oxidants, anti-oxidants, anti-static agents, ultraviolet light absorbents, fire retardants, processing oils, mold release agents, fillers, pigments/dyes, coloring agents, and other similar compositions. Any additive known to those of ordinary skill in the art to be useful in the preparation of styrenic copolymers may be used.

In an embodiment, styrene monomer is combined with a polar functional comonomer and subsequently polymerized to form a polar polystyrene copolymer. The polar polystyrene copolymer can then be combined with PLA to obtain a blend.

In an embodiment, styrene monomer is combined with a polar functional comonomer and subsequently polymerized to form a polar polystyrene copolymer. The polar polystyrene copolymer can then be combined with polystyrene and a biodegradable polymer to obtain a blend. In another embodiment, the polystyrene is selected from general purpose polystyrene (GPPS) and high impact polystyrene (HIPS) and combinations thereof.

In an embodiment, styrene monomer is combined with a second monomer and subsequently polymerized to form a polystyrene copolymer. The polystyrene copolymer may then be combined with at least one polar additive and a biodegradable polymer to form a blend. In an embodiment, the polystyrene copolymer is first mixed with at least one polar additive and then mixed with biodegradable polymer to obtain a blend. In another embodiment, the polystyrene copolymer is first mixed with biodegradable polymer and then mixed with at least one polar additive to obtain a blend. In a further embodiment, the polystyrene copolymer is simultaneously combined with biodegradable polymer and at least one polar additive to obtain a blend. The final blend may then be sent to an extruder or other step to obtain an end use article.

In an embodiment, styrene monomer is combined with a polar comonomer and a plasticizer and subsequently polymerized to form a polar polystyrene copolymer. The polar polystyrene copolymer can then be combined with a biodegradable polymer to obtain a blend.

The styrenic copolymer of the presently disclosed composition may have any desired molecular weight that enhances the polarity distribution that may improve the dispersion of biodegradable polymers when compared to general purpose polystyrene. In an embodiment, the styrenic copolymer of the presently disclosed composition may have a number average molecular weight (Mn) ranging from 40,000 g/mol to 10,000,000 g/mol. In another embodiment, the styrenic copolymer has an Mn ranging from 50,000 to 200,000 g/mol. In a further embodiment, the styrenic copolymer has an Mn ranging from 75,000 to 150,000 g/mol. The styrenic copolymer may have a weight average molecular weight (Mw) ranging from 100,000 g/mol to 10,000,000 g/mol. In another embodiment, the styrenic copolymer has an Mw ranging from 200,000 to 500,000 g/mol. In a further embodiment, the styrenic copolymer has an Mw ranging from 250,000 to 400,000 g/mol. The styrenic copolymer may have a z-average molecular weight (Mz) ranging from 200,000 g/mol to 10,000,000 g/mol. In another embodiment, the styrenic copolymer has an Mz ranging from 300,000 to 800,000 g/mol. In a further embodiment, the styrenic copolymer has an Mz ranging from 400,000 to 550,000 g/mol.

In an embodiment, the blend has a polydispersity index (PDI) (Mw/Mn) ranging from 1.0 to 5.0. In another embodiment, the blend has a polydispersity index ranging from 1.5 to 3.0. In a further embodiment, the blend has a polydispersity index ranging from 2.0 to 2.5.

In an embodiment, the composition of the presently disclosed composition has a melt flow index (MFI), or melt flow rate (MFR), of at least 1.0 g/10 min. as determined in accordance with ASTM D-1238. In another embodiment, the composition has a melt flow rate (MFR) ranging from 2.0 g/10 min to 30.0 g/10 min. In an alternative embodiment, the composition has a MFR ranging from 1.5 to 5.0 g/10 min. In another alternative embodiment, the composition has a MFR ranging from 1.5 to 3.0 g/10 min. In a further embodiment, the composition has a MFR ranging from 2.0 to 2.5 g/10 min.

In an embodiment, the composition has a glass transition temperature (Tg) ranging from 50 to 200° C. In another embodiment, the composition has a Tg ranging from 75 to 150° C. In a further embodiment, the composition has a Tg ranging from 80 to 110° C. In an even further embodiment, the composition has a Tg ranging from 85 to 103° C.

In an embodiment, the blend of the presently disclosed composition has an average particle size (phase domain size) distribution, defined as (D90-D10)/D50, ranging from 0.1 to 1000. In the equation, (D90-D10)/D50, D90, D10, and D50 represent diameters at which 90%, 10%, and 50% of particles are smaller than, respectively. In another embodiment, the blend has an average particle size distribution ranging from 10 to 1000.

In a further embodiment, the blend has a particle size distribution having a peak particle size ranging from 30 to 300 μm. In an alternative embodiment, the blend has a particle size distribution having a peak particle size ranging from 0.3 to 3 μm. In another alternative embodiment, the blend has a particle size distribution having a peak particle size ranging from 2 to 10 μm.

In an embodiment, the blend of the presently disclosed composition has an average particle size ranging from 0.3 to 30 μm. In another embodiment, the blend has an average particle size ranging from 1 to 15 μm. In a further embodiment, the blend has an average particle size ranging from 2 to 8 μm.

An end use article may include a blend of the presently disclosed composition. In an embodiment, the articles include films, sheets and thermoformed or foamed articles. For example, a final article may be thermoformed from a sheet containing the blend. In an embodiment, an article can be obtained by subjecting the polymeric composition to a plastics shaping process such as blow molding, extrusion, injection blow molding, injection stretch blow molding, thermoforming, and the like. The polymeric composition may be formed into end use articles including food packaging, office supplies, plastic lumber, replacement lumber, patio decking, structural supports, laminate flooring compositions, polymeric foam substrate, decorative surfaces, outdoor furniture, point-of-purchase signs and displays, house wares and consumer goods, building insulation, cosmetics packaging, outdoor replacement materials, lids and food/beverage containers, appliances, utensils, electronic components, automotive parts, enclosures, protective head gear, medical supplies, toys, golf clubs and accessories, piping, business machines and telephone components, shower heads, door handles, faucet handles, and the like.

EXAMPLES

Example 1

A series of polystyrene samples were made with the addition of polar modifiers as co-monomers or additives as listed in Table 1. The polar modifiers listed include styrene-maleic anhydride (SMA) used as additives, including SMA® 1000P, SMA® 3000P, and SMA® EF80, which are all commercially available from Sartomer Company, Inc. The polar modifiers listed in Table 1 also include butyl acrylate, butyl methacrylate, hydroxyethylmethacrylate (HEMA), and maleic anhydride (MAH), which were used as co-monomers. In Table 1, PDI represents polydispersity index, $Tg_1$ represents the first glass transition temperature and $Tg_2$ represents a second glass transition temperature, if applicable.

TABLE 1

Characterization of Modified Polystyrene

| | | Modifier | | |
| --- | --- | --- | --- | --- |
| | None | SMA 1000P (1:1) | SMA 3000P (3:1) | SMA EF80 (8:1) |
| wt % | 0 | 5.0 | 5.0 | 5.0 |
| mol (# of moles of polar | 0 | 0.025 | 0.012 | 0.005 |

TABLE 1-continued

Characterization of Modified Polystyrene

| monomer unit)/(100 g of polymer) | | | | |
|---|---|---|---|---|
| Transparency | Clear | Opaque | Opaque | Opaque |
| $Tg_1$ | 105.2 | 104.8 | 104.5 | 104.4 |
| $Tg_2$ | n/a | 169.3 | n/a | n/a |
| Melt Flow Rate | 2.1 | 2.2 | 2.8 | 2.9 |
| Mn | 130,000 | 138,000 | 132,000 | 84,100 |
| Mw | 271,000 | 273,000 | 269,000 | 262,000 |
| Mz | 415,000 | 439,000 | 418,000 | 417,000 |
| PDI | 2.1 | 2.0 | 2.0 | 3.1 |
| Peak MW | 259,000 | 255,000 | 259,000 | 265,000 |

| | Modifier | | | | |
|---|---|---|---|---|---|
| | Butyl Acrylate | Butyl Methacrylate | HEMA | MAH | MAH |
| wt % | 5.0 | 5.0 | 5.0 | 1.75 | 3.5 |
| mol (# of moles of polar monomer unit)/(100 g of polymer) | 0.039 | 0.035 | 0.038 | 0.018 | 0.036 |
| Transparency | Clear | Clear | Clear | Clear | Semi-clear |
| $Tg_1$ | 94.8 | 98.2 | 102.6 | 105.0 | 104.0 |
| $Tg_2$ | n/a | n/a | n/a | n/a | n/a |
| Melt Flow Rate | 3.3 | 2.9 | 1.7 | 2.2 | 3.3 |
| Mn | 136,000 | 122,000 | 128,000 | 115,000 | 97,300 |
| Mw | 184,000 | 260,000 | 312,000 | 250,000 | 220,000 |
| Mz | 433,000 | 398,000 | 529,000 | 391,000 | 350,000 |
| PDI | 2.1 | 2.1 | 2.4 | 2.2 | 2.3 |
| Peak MW | 271,000 | 250,000 | 270,000 | 239,000 | 212,000 |

Figure 2:
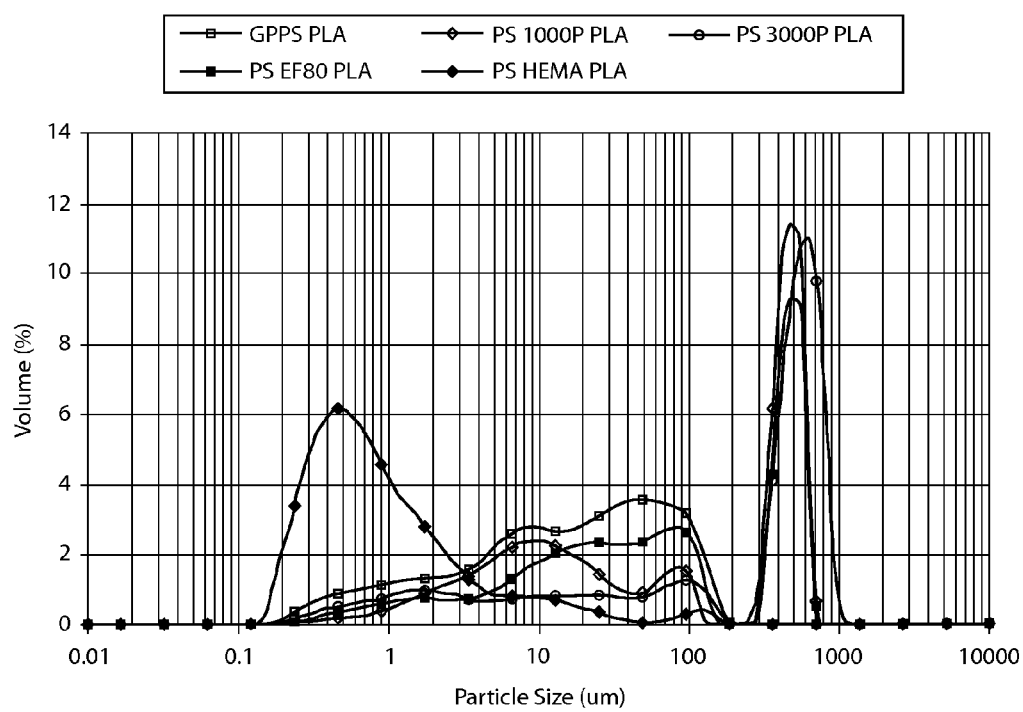
FIG. 2 is a graph illustrating PLA particle size distribution from blends of PLA with polystyrene modified with SMAs.

An indicator of polarity change in polystyrene is how well the material blends with another polar polymer such as polylactic acid (PLA). In this example, the modified polystyrene samples above were blended with 5 wt % PLA in a mixer. The mixer was operated under a temperature of 210° C. under a nitrogen atmosphere for 3 minutes with agitation under speeds of 60 rpm. The resulting blends were opaque. The size of PLA particles in the blends was evaluated by dynamic light scattering. The blend samples were dispersed in methyl ethyl ketone (MEK), a good solvent for polystyrene but not for PLA. FIG. 1 and FIG. 2 show the PLA particle size distribution from different polystyrene blends. FIG. 1 compares polystyrene copolymerized with different comonomers. All of the polystyrene copolymer samples showed increased dispersion of PLA when compared to crystal polystyrene. Incorporation of HEMA showed a narrower distribution peaked at particle sizes of 0.5 μm. Similar results were obtained with polystyrene modified by butylacrylate/methacrylates as well as maleic anhydride. Appearances of multiple maxima (or peaks) at 10 to 100 μm indicated a significant presence of large PLA domains in those blends.

FIG. 2 compares polystyrene modified with different styrene-maleic anhydride copolymers (SMAs). The SMAs were incorporated into polystyrene during batch reactions as a way of physical blending. The PLA particle size distributions from the SMA blends did not demonstrate a noticeable decrease when compared to GPPS. Wider PLA particle size distributions were observed in the SMA blends compared with polystyrene modified through copolymerization with polar comonomers. The SMAs were not as effective as polar comonomers due to the relatively lower molar concentration of polar groups of SMAs under the same weight percentage loading (see Table 1 above). In addition, the SMAs containing the higher percentage of maleic anhydride (such as 1000P and 3000P) were less soluble in styrene. A miscible blend of GPPS and SMA was only made with SMA EF80, which had a styrene-to-maleic anhydride of 8:1 and contained the lowest concentration of maleic anhydride among the various SMAs used.

Example 2

In a second example, seven modified polystyrene samples were polymerized and analyzed. For each sample, 2.5 wt % of HEMA was added as a comonomer, based on the total weight of the feed to be polymerized. Also for each sample, the polarity in polystyrene was further enhanced through the physical addition of certain polar additives. Each sample was characterized in terms of molecular weight, melt flow index and thermal behavior, as listed in Table 2. The type of polar additive used varied in each sample. In the first sample, no polar additive was used, while six different polar additives were used in the remaining samples. The five polar additives were styrene maleic anhydride (SMA), including styrene-to-maleic anhydride ratios of 4:1 (SMA EF40) and 8:1 (SMA EF80), poly(1,4-butlyene adipate) (Adipate), epoxidized linseed oil (Vikoflex® 7190, commercially produced by Arkema, Inc.) (V7190), polyethylene glycol (PEG400), and polyethylene glycol (PEG1000).

TABLE 2

Molecular Weights, Melt Index and Glass Transition
Temperature of Modified Polystyrene.

| Additive | Mn | Mw | Mz | Mp | PDI | MFI | Tg (° C.) | Mn of Plasticizer |
|---|---|---|---|---|---|---|---|---|
| None | 142000 | 336000 | 523000 | 315000 | 2.4 | 1.9 | 103.2 | + |
| EF40 | 104000 | 338000 | 675000 | 253000 | 3.3 | 1.1 | 103.7 | 4500 |
| EF80 | 97000 | 299000 | 534000 | 260000 | 3.1 | 2.1 | 103.2 | 7500 |
| Adipate | 132000 | 282000 | 438000 | 267000 | 2.1 | 3.8 | 95.9 | 1000 |
| V7190 | 122000 | 264000 | 414000 | 247000 | 2.2 | 4.0 | 89.7 | 878 |
| PEG400 | 120000 | 261000 | 405000 | 247000 | 2.2 | 4.7 | 87.6 | 400 |
| PEG1000 | 115000 | 265000 | 424000 | 286000 | 2.3 | 3.9 | 87.4 | 1000 |

Figure 3:
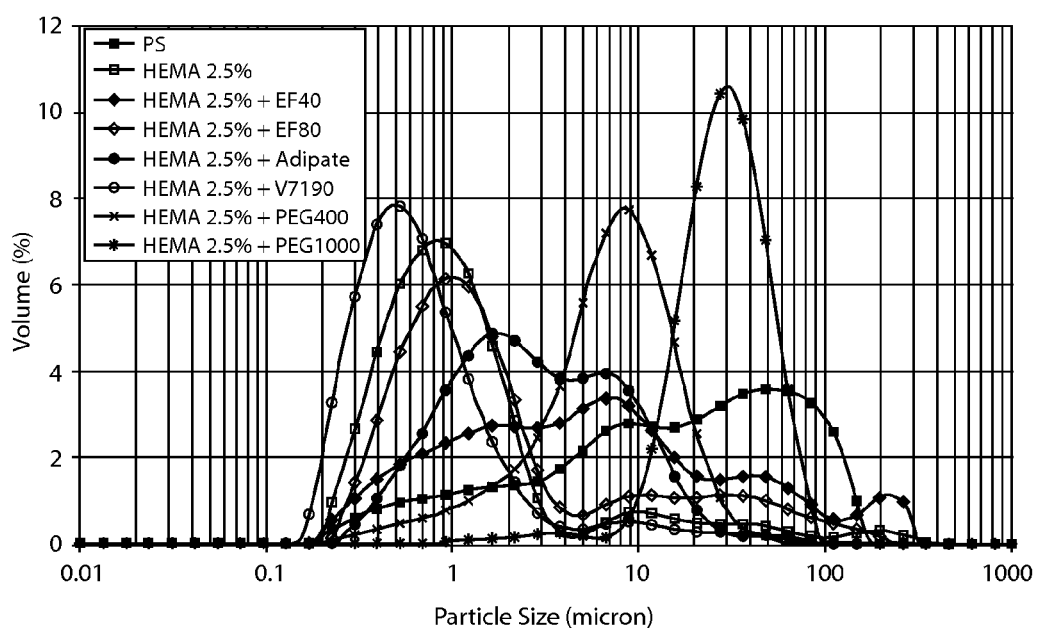
FIG. 3 is a graph illustrating PLA particle size distribution from blends of PLA in plasticized HEMA-modified polystyrene.

These polystyrene samples were then blended with polylactic acid (PLA). An indirect indicator of polarity change in polystyrene is how well the material blends with another polar polymer such as PLA. The polarity change of the modified polystyrene was evaluated by physically blending the plasticized polystyrene with 5 wt % PLA Ingeo™ 3251D, commercially available from NatureWorks LLC, in a Haake mixer. The mixer was operated under a temperature of 210° C. under a nitrogen atmosphere for 3 minutes with agitation under speeds of 60 rpm. The PLA domain size in polystyrene was characterized by dynamic light scattering in methyl ethyl ketone (MEK), which is a good solvent for polystyrene but not for PLA. The results in FIG. 3 show that the PLA blend with HEMA only modified polystyene has a PLA domain size of about 0.8~0.9 μm. Using HEMA only modified polystyene as a reference, the size of the PLA domain was further reduced when the polymer was modified with epoxidized linseed oil (V7190) which gave a distribution that peaked around 0.5 μm. The use of polyether (PEG400 and PEG1000) led to a very large, while uniform, distribution of particle size. The span of PLA domain size distibution in PEG1000 led is only 1.4, the smallest observed among the samples as shown in Table 3.

TABLE 3

| Modifier Type | Vol. Weighted Mean/μm | d (0.1)/μm | d (0.5)/μm | d (0.9)/μm | Span |
|---|---|---|---|---|---|
| PS | 33.537 | 1.097 | 17.522 | 92.643 | 5.225 |
| HEMA 2.5% | 7.903 | 0.408 | 0.997 | 10.009 | 9.632 |
| HEMA 2.5% + SMA EF40 2.3% | 24.787 | 0.634 | 5.319 | 65.043 | 12.109 |
| HEMA 2.5% + SMA EF80 2.3% | 10.443 | 0.503 | 1.366 | 30.856 | 22.221 |
| HEMA 2.5% + Adipate 2.3% | 5.408 | 0.773 | 2.823 | 12.056 | 3.997 |
| HEMA 2.5% + Vikoflex 7190 2.3% | 1.784 | 0.295 | 0.642 | 2.235 | 3.023 |
| HEMA 2.5% + PEG400 2.3% | 9.533 | 2.004 | 7.844 | 18.277 | 2.075 |
| HEMA 2.5% + PEG1000 2.3% | 34.114 | 15.489 | 31.033 | 57.855 | 1.365 |

Example 3

Hydroxyl functional polystyrene was prepared in a batch reaction process by copolymerizing styrene with 2-hydroxyethyl methacrylate (HEMA) at varied concentrations ranging from 0 to 5 wt. % in the feed (see Table 4). The polymerization reaction was carried out in a CSTR-type batch reactor. Lupersol-233, available from Arkema, was added as the initiator with an initial concentration of about 170 ppm in the reaction mixture. The reaction was then run isothermally at 130° C. with continuous agitation at 150 rpm for about 3 hours or until 75% conversion was obtained. The reaction mixture was then transferred onto an aluminum pan and devolatized under active vacuum of less than 10 torr at 225° C. for 45 minutes. The resulting material adhered to the aluminum surface of the aluminum pan.

TABLE 4

Feed Formulations in Batch Synthesis of HEMA-modified polystyrene

| | Run No. | | | | |
|---|---|---|---|---|---|
| | 0 | 1 | 2 | 3 | 4 |
| Styrene (grams) | 200 | 198 | 195 | 190 | 185.4 |
| HEMA (grams) | 0 | 2 | 5 | 10 | 10.0 |
| HEMA (%) | 0.0 | 1.0 | 2.5 | 5.0 | 5.0 |
| SMA EF-80 (grams) | 0 | 0 | 0 | 0 | 4.6 |
| TOTAL (grams) | 200 | 200 | 200 | 200 | 200.00 |

The solvent resistance was measured as the solvent intake relative to the mass of polymer sample (of the same dimension), which was exposed to a particular solvent in a given time period (e.g., 30 min) at room temperature. The results in Table 5 demonstrate that HEMA-modified polystyrene (2.5 wt. %) has a substantially lower solvent intake toward "oil" and thereby a higher resistance to the oil. The oil in this example is a 50/50 mixture of oleic acid and cottonseed oil. The solvent resistance of HEMA copolymer toward protonated polar methanol was lower than the crystal polystyrene reference, and therefore, there was more methanol intake to the HEMA copolymer than the crystal polystyrene reference.

TABLE 5

Solvent Intake Relative to Mass of Polymer Samples

| | Oil | MeOH (solvent) |
|---|---|---|
| HEMA-modified Polystyrene | 0.24 wt % | 0.47 wt % |
| Polystyrene reference | 1.62 wt % | 0.10 wt % |

Figure 4:
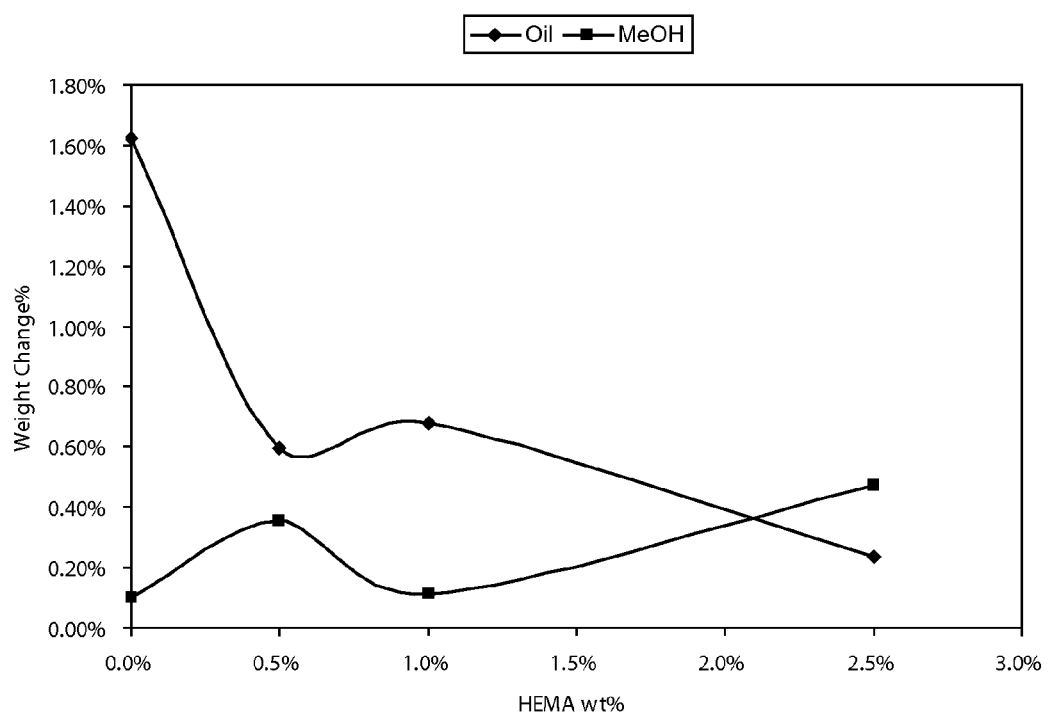
FIG. 4 is a graph illustrating solvent intake in HEMA-modified polystyrene.

Sheets of hydroxyl polystyrene were prepared from samples containing varied concentration of HEMA (0, 0.5, 1, 2.5 wt. %). Solvent intake experiments were conducted to generate a more detailed trend of solvent resistance change as a function of HEMA concentration. The results in FIG. 4 show an increase of resistance toward the oil even with a minimal addition of HEMA (0.5 wt. %). Marginal changes were observed with additional HEMA incorporation (2.5 wt. %).

Figure 5:
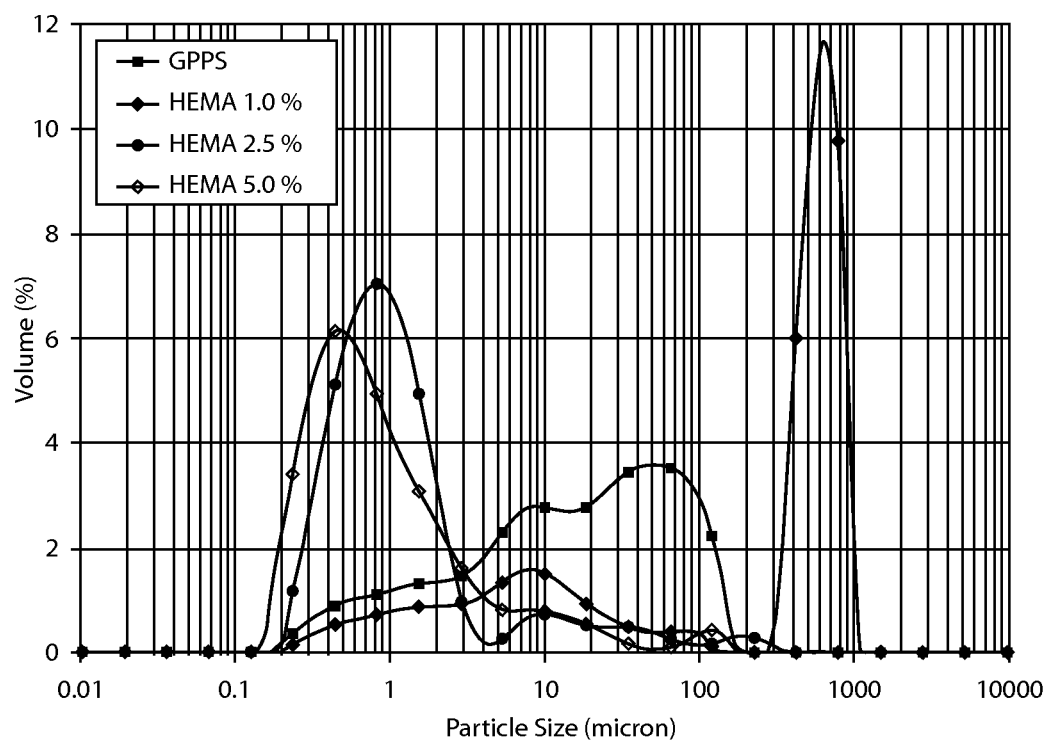
FIG. 5 is a graph illustrating the PLA particle size distribution in HEMA-modified polystyrene.

Polarity of HEMA-modified polystyrene was evaluated based on miscibility with PLA. As evident from FIG. 5, the size of the PLA phase in polystyrene is strongly dependent on the amount of HEMA. With 5 wt % of HEMA, the peak value of the PLA particle size was as low as 0.5 μm, while that for un-modified polystyrene was much larger. The PLA particle size distribution was also more uniform.

Example 4

In a continued investigation on the effects of polar functionality on biopolymer miscibility into polystyrene, polyethylene glycol (PEG) of different molecular weights and chemical form were studied. Two approaches were used to introduce PEG functionality into polystyrene, physically and chemically. In the first approach, PEG, at a loading of about 2 wt %, was added into the batch reactor as an additive, along with styrene monomer and HEMA co-monomer (in an amount of 2.5 wt. %). As the batch polymerization proceeded, PEG was incorporated into the polystyrene matrix through physical, polar interactions with functional groups of the co-monomer along the polystyrene backbone. A PEG with an Mn value of 400 g/mol and a PEG with an Mn value of 1000 g/mol were each used as additives. In a second approach, PEG was incorporated into the polystyrene backbone through copolymerization of styrene with a monofunctional methoxylated PEG methacrylate monomer (in an amount of 5 wt %). Two such monomers were used, with PEG molecular weights of 350 and 550 g/mol, respectively.

The structures of PEG functional compounds/co-monomers are illustrated below.

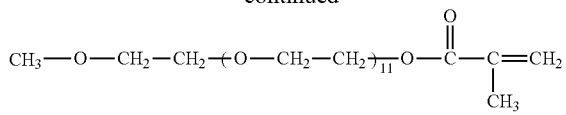

Poly(ethylene glycol) Mn = 400 or 950~1050

$$CH_3-O-CH_2-CH_2-(O-CH_2-CH_2)_6-O-\overset{\overset{O}{\|}}{C}-\underset{\underset{CH_3}{|}}{C}=CH_2$$

Methoxy polyethylene glycol (350) monomethacrylate $$CH_3-O-CH_2-CH_2-(O-CH_2-CH_2)_{11}-O-\overset{\overset{O}{\|}}{C}-\underset{\underset{CH_3}{|}}{C}=CH_2$$

Methoxy polyethylene glycol (550) monomethacrylate

Figure 6:
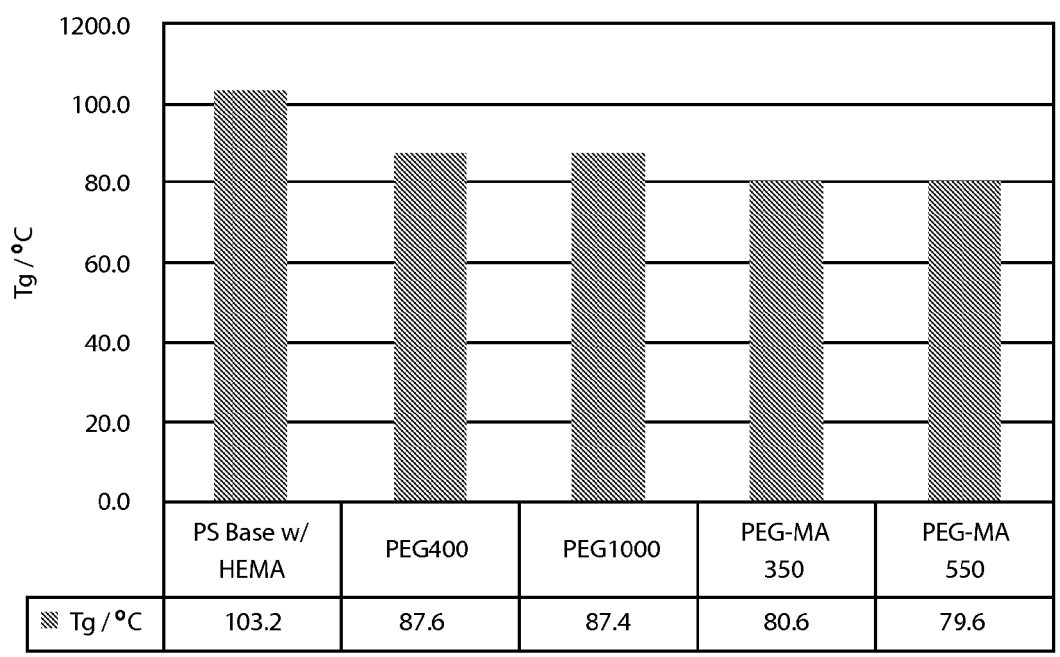
FIG. 6 is a graph illustrating the glass transition temperature of PEG modified polystyrene and HEMA-modified polystyrene.

The plasticization effect of PEG can be seen from the decrease in the glass transition temperature as shown in Table 6 and FIG. 6. Further examination of data reveals that the glass transition temperature (Tg) was slightly lower when the PEG having a higher molecular weight was incorporated. It also appears that use of a PEG-functionalized co-monomer was more effective at depressing the glass transition temperature than physical dispersion of PEG in HEMA-modified polystyrene. The plasticization effect can also be observed from an increase of melt flow in PEG functional polystyrene (see Table 6). The melt flow after PEG modification doubled compared to the polystyrene reference, except for PEG-MA 350 where a substantially high Mz value (1.1 Million) and a relatively low melt flow (0.3) were observed. Also, a large increase of more than 100% in polydispersity (Mw/Mn) was observed for PEG-MA 350.

TABLE 6

Characterization of PEG Functional Polystyrene

| Modified Polystyrene | Mn (g·mol⁻¹) | Mn (g·mol⁻¹) | Mn (g·mol⁻¹) | Mn (g·mol⁻¹) | Mw/Mn | MFI (g·10 min⁻¹) | Tg (°C.) |
|---|---|---|---|---|---|---|---|
| Polystyrene reference | 129,000 | 269,000 | 408,000 | 260,000 | 2.1 | 2.2 | 104.4 |
| HEMA 2.5% | 142,000 | 336,000 | 523,000 | 315,000 | 2.4 | 1.9~2.3 | 103.2 |
| HEMA 2.5% + PEG400 | 120,000 | 261,000 | 405,000 | 247,000 | 2.2 | 4.7 | 87.6 |
| HEMA 2.5% + PEG1000 | 115,000 | 265,000 | 424,000 | 286,000 | 2.3 | 3.9 | 87.4 |
| PEG-MA 350 | 68,800 | 383,000 | 1,110,000 | 167,000 | 5.6 | 0.3 | 80.6 |
| PEG-550 | 106,000 | 334,000 | 681,000 | 242,000 | 3.2 | 4.4 | 79.6 |

Figure 7:
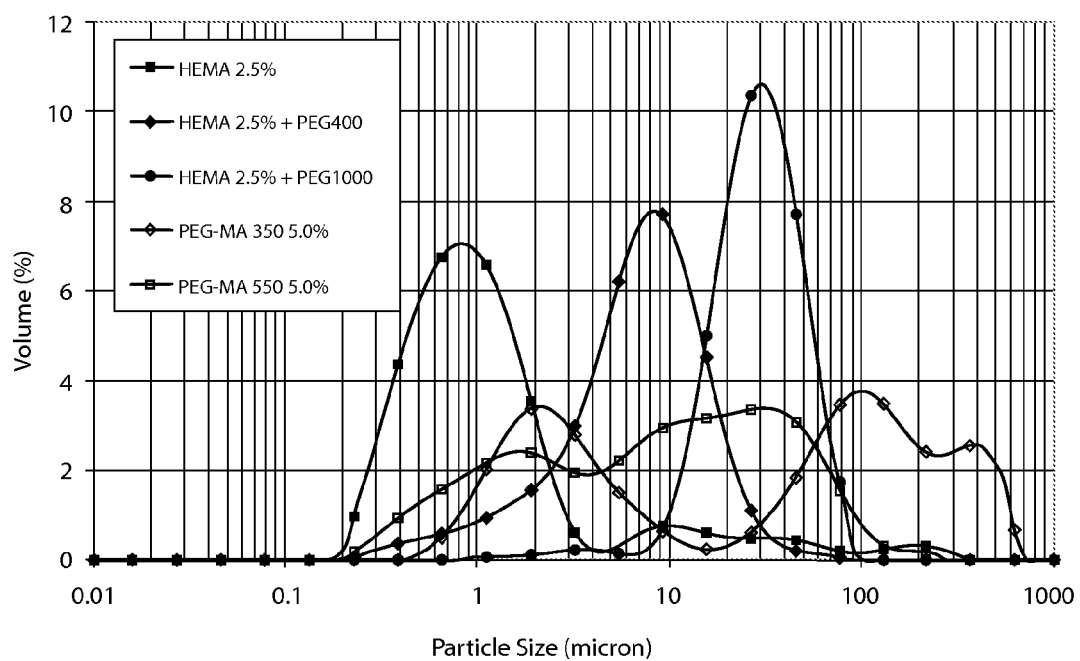
FIG. 7 is a graph illustrating PLA particle size distribution of HEMA-modified polystyrene and PEG modified polystyrene.

PLA compatibility was evaluated by physically blending a modified polystyrene sample with 5 wt % PLA 3251 in a mixer at 210° C. under a nitrogen atmosphere for 3 minutes at 60 rpm. The PLA domain size in polystyrene was characterized by dynamic light scattering in MEK utilizing a Malvern particle size analyzer and are shown in FIG. 7. Dynamic light scattering experiments show that the PLA blend with un-plasticized HEMA-modified polystyrene had a PLA domain size of about 0.8 to 0.9 μm (peak value). The use of PEG-400 leads to a narrower particle size distribution but with a size one order of magnitude larger at about 8 to 9 μm. The use of the higher molecular weight PEG-1000 continued to narrow the size distribution while driving up the size of the PLA domain to about 30 to 40 μm at peak. The PEG functional co-monomer was not very effective at compatibilizing PLA. The PLA domain size in the blends had a wide distribution from 2 to 100 μm.

Example 5

Batch reactions were run to incorporate varied amounts of 0, 1, 2.5 and 5 wt % of caprolactone acrylate into polystyrene, according to the formulations shown in Table 8. The batch run conditions were the same as those for HEMA-modified polystyrene in Example 1. With caprolactone in the feed, the reaction appeared to drive up the viscosity significantly at an early stage of the polymerization, particularly with 5 wt % of caprolactone in the feed. The resulting polystyrene had a strong tendency to climb the stir shaft and the reaction had to be stopped at a conversion of 50%. Similar phenomenon was observed with 2.5 wt % caprolactone acrylate but to a lesser extent. The reaction continued to finish at 62% conversion. In contrast, no such reaction issues were observed with HEMA as the co-monomer.

TABLE 7

Feed Formulations in Batch Synthesis of Caprolactone Functional Polystyrene

| | Run No. | | | |
|---|---|---|---|---|
| | 1 | 2 | 3 | 4 |
| Styrene (g) | 200 | 198 | 195 | 190 |
| Caprolactone (g) | 0 | 2 | 5 | 10 |
| Caprolactone (wt %) | 0.0% | 1.0% | 2.5% | 5.0% |
| TOTAL | 200 | 200 | 200 | 200 |

Figure 8:
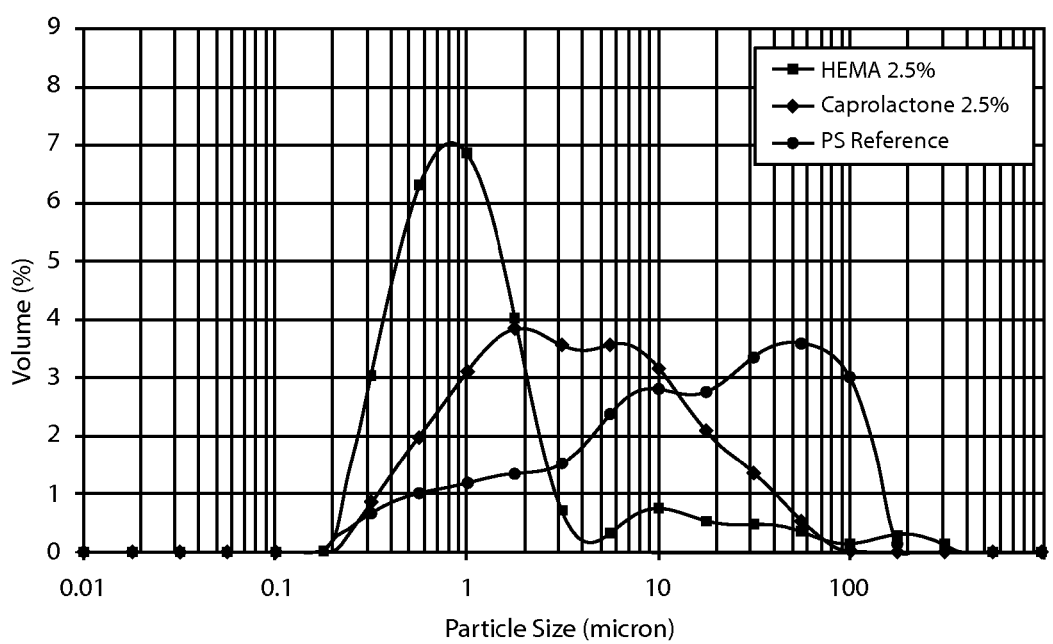
FIG. 8 is a graph illustrating PLA particle size distribution of HEMA-modified polystyrene and Caprolactone modified polystyrene and an unmodified polystyrene reference.

The miscibility test with PLA was conducted with the results shown in FIG. 8. Compared to an un-modified polystyrene reference as well as HEMA-modified polystyrene, the caprolactone functional polystyrene shows performance somewhere in the middle. While the compatibility of polystyrene with PLA increases with the addition of caprolactone functionality, the polar interaction seems to be less than that with HEMA at similar weight concentration.

As used herein, the term "biodegradable" refers to any composition that is compostable or degrades from environmental heat, moisture, or from the action of naturally occurring microorganisms, such as bacteria, fungi, and algae.

As used herein, the term "bio-polymer" refers to polymers that are bio-derived, or otherwise produced by living organisms.

As used herein, the term "co-monomer" refers to a monomer which is copolymerized with at least one different monomer in a copolymerization reaction resulting in a copolymer.

As used herein, the terms "Continuous Stirred-Tank Reactor," and "Continuously-Stirred Tank Reactor" and "CSTR," refer to a tank which has a rotor which stirs reagents within the tank to ensure proper mixing; a CSTR can be used for a variety of reactions and processes.

As used herein, the term "co-polymer," also known as a "heteropolymer," is a polymer resulting from polymerization of two or more monomer species.

As used herein, the term "copolymerization" refers to the simultaneous polymerization of two or more monomer species.

As used herein, the term "homopolymer" refers to a polymer resulting from polymerization of a single monomer species.

As used herein, the term "monomer" refers to a relatively simple compound, usually containing carbon and of low molecular weight, which can react by combining one or more similar compounds with itself to produce a polymer.

As used herein, the term "polymer" generally includes, but is not limited to homopolymers, co-polymers, such as, for example, block, graft, random and alternating copolymers, and combinations and modifications thereof.

As used herein, the term "polar functional group" generally refers to a group of atoms within or attached to a molecule that exhibits a degree of polarity or imparts a degree of polar functionality to the molecule.

It is to be understood that while illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

While the foregoing is directed to embodiments, versions and examples of the presently disclosed composition, which are included to enable a person of ordinary skill in the art to make and use when the information in this patent is combined with available information and technology, the embodiments are not limited to only these particular embodiments, versions and examples. Also, it is within the scope of this disclosure that the embodiments disclosed herein are usable and combinable with every other embodiment disclosed herein, and consequently, this disclosure is enabling for any and all combinations of the embodiments disclosed herein.

What is claimed is:

1. A styrenic composition comprising:
   a polar modified styrenic co-polymer resulting from the polymerization of a combined mixture of at least one styrenic monomer and at least one comonomer;
   a biodegradable component comprising polylactic acid; and
   a polar additive, wherein the polar additive is polyether, wherein the at least one comonomer comprises a polar functional group, the at least one comonomer selected from the group consisting of caprolactone(meth)acrylate, polyethylene glycol(meth)acrylate, silyl-(meth)acrylate, and fluoro-alkyl(meth)acrylate;
   wherein the polar modified styrenic co-polymer and the biodegradable component are combined to obtain a styrenic composition comprising the biodegradable component.

2. The composition of claim 1, wherein the polar additive is present in the styrenic composition in amounts ranging from 0.5 to 10 wt % based on the total weight of the styrenic composition.

3. The composition of claim 1, wherein the polar modified styrenic co-polymer is present in amounts ranging from 75 to 99 wt % based on the total weight of the styrenic composition.

4. The composition of claim 1, wherein the biodegradable component in the styrenic composition has a particle size distribution having a peak particle size of less than 2.0 µm.

5. The composition of claim 1, wherein the styrenic composition comprising the biodegradable component exhibits a polydispersity index ranging from 1.0 to 5.0.

6. The composition of claim 1, wherein the styrenic composition comprising the biodegradable component exhibits a melt flow index of at least 1.0 g/10 min., as determined in accordance with ASTM D-1238.

7. The composition of claim 1, wherein the styrenic composition comprising the biodegradable component exhibits a glass transition temperature ranging from 50 to 200° C.

8. The composition of claim 1, wherein the styrenic composition comprising the biodegradable component has an average particle size distribution ranging from 0.1 to 1000.

9. The composition of claim 1, wherein the styrenic composition comprising the biodegradable component has a particle size distribution having a peak particle size ranging from 30 to 300 µm.

10. The composition of claim 1, wherein the styrenic composition comprising the biodegradable component has a particle size distribution having a peak particle size ranging from 0.3 to 3 µm.

11. The composition of claim 1, wherein the styrenic composition comprising the biodegradable component has a particle size distribution having a peak particle size ranging from 2 to 10 µm.

12. The composition of claim 1, wherein the styrenic composition comprising the biodegradable component has an average particle size ranging from 0.3 to 30 µm.

13. The composition of claim 1, wherein the polar additive comprises polyethylene glycol.

14. The composition of claim 1, wherein the polar modified styrenic co-polymer is present in amounts ranging from 92 to 99 wt % based on the total weight of the styrenic polymer.

15. The composition of claim 1, wherein the polylactic acid is present in amounts ranging from 0.1 to 8 wt % based on the total weight of the styrenic polymer.

16. An article made from the composition of claim 1.

17. A method of making a styrenic polymer comprising a biodegradable component comprising:

combining a styrenic monomer and a comonomer comprising a polar functional group to form a combined mixture, the comonomer comprising a polar functional group selected from the group consisting of caprolactone(meth)acrylate, polyethylene glycol(meth)acrylate, silyl-(meth)acrylate, and fluoro-alkyl(meth)acrylate;

subjecting the combined mixture to polymerization to obtain a polar modified styrenic co-polymer; and combining the polar modified styrenic co-polymer with a biodegradable component and a polar additive to obtain the styrenic polymer comprising the biodegradable component, wherein the biodegradable component comprises polylactic acid, and wherein the polar additive comprises styrene maleic anhydride, glyceride oil, polyether, polyester, or combinations thereof.

18. The method of claim 17, wherein the biodegradable component in the styrenic composition has a particle size distribution having a peak particle size of less than 2.0 µm.

* * * * *